United States Patent [19]
Senoo et al.

[11] 4,381,525
[45] Apr. 26, 1983

[54] SYNCHRONOUSLY OPERATABLE PCM RECORDING PROCESSOR

[75] Inventors: Takanori Senoo, Hirakata; Nobuyasu Takeguchi, Osaka; Kazuo Nomura, Itami, all of Japan

[73] Assignee: Matsushita Electric Industrial Co., Ltd., Osaka, Japan

[21] Appl. No.: 320,115

[22] Filed: Nov. 10, 1981

[30] Foreign Application Priority Data

Nov. 10, 1980 [JP] Japan ............................. 55-156968

[51] Int. Cl.³ .......................... G11B 5/00; G11B 5/09
[52] U.S. Cl. ......................................... 360/32; 360/51
[58] Field of Search .................................. 360/32, 51

[56] References Cited
U.S. PATENT DOCUMENTS 4,277,807  7/1981  Baldwin ............................... 360/32
4,286,294  8/1981  Nakauchi et al. ..................... 360/32

Primary Examiner—Vincent P. Canney
Attorney, Agent, or Firm—Wenderoth, Lind & Ponack

[57] ABSTRACT

A PCM recording processor which is synchronously operatable is disclosed. Two kinds of clock signals and two kinds of synchronizing signals enable two PCM recording processors to operate so as to be synchronized with each other. One master mode processor sends signals to plural slave mode processors through bi-directional input/output ports. These two modes are easily switchable. The synchronizing signals are generated by AND-gating each output of asynchronously cascaded counters in the timing generators in a PCM recording processor. A counter in the first stage of the cascaded counters is synchronously reset by the synchronizing signal and the other counters in the following stages are asynchronously reset by a delayed synchronizing signal in the slave mode processor.

2 Claims, 8 Drawing Figures

SYNCHRONOUSLY OPERATABLE PCM RECORDING PROCESSOR

BACKGROUND OF THE INVENTION

This invention relates to a synchronously operatable PCM recording processor which converts analog signals such as music signals to digital signals such as pulse code modulated (PCM) signals; records the PCM signals on a recording medium such as magnetic tape; and reproduces the analog signals from the PCM signals on the recording medium.

Conventionally, PCM recording processors don't have any synchronizing means for synchronizing with each other. That is, they don't have any synchronizing signal generating means nor input means for receiving such a synchronizing signal for synchronizing with each other. Consequently, conventional PCM recording processors cannot work synchronously with each other but just work independently. Thus, they have a fault in that, for example, when four channel recording or reproducing is effected using four PCM recording processors, i.e.—using one processor for each channel, the four signal of the four channels cannot be recorded nor reproduced simultaneously. This is a big problem when these four channel signals are mixed into one channel.

SUMMARY OF THE INVENTION

A PCM recording processor according to this invention is able to record or reproduce signals while synchronized with other PCM recording processors. It therefore becomes possible, for example, to mix four channel signals into one channel using the PCM recording processors according to this invention.

BRIEF DESCRIPTION OF THE DRAWINGS

This invention will be described in detail, hereinafter, with the accompanying drawings in which.

DESCRIPTION OF THE PREFERRED EMBODIMENT

Before describing the synchronous operation of this invention, the following is a description of the PCM recording processor.

Figure 1:
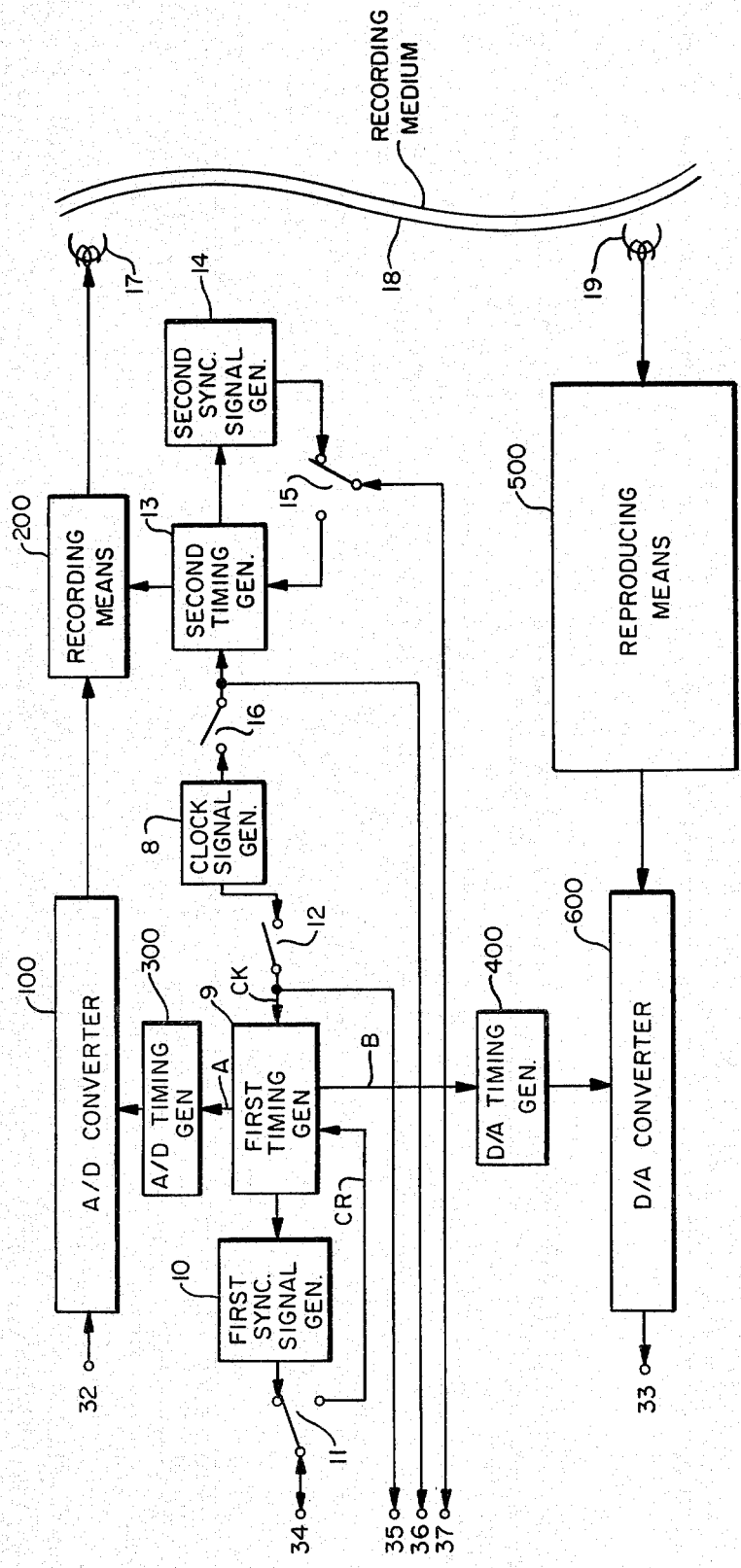
FIG. 1 is a block diagram of a PCM recording processor which is synchronously operatable according to this invention.
Figure 4:
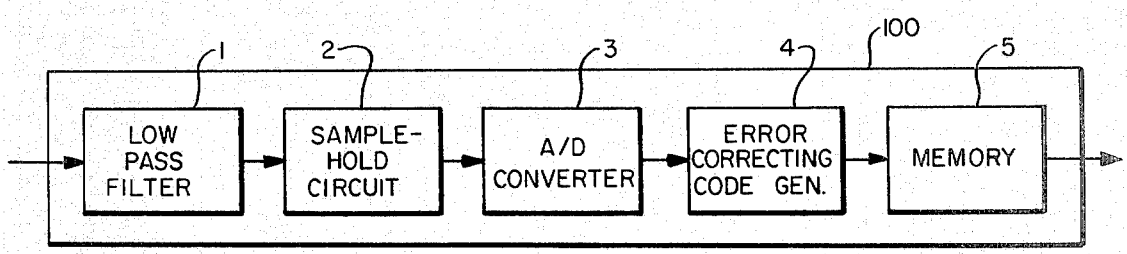
FIG. 4 is a schematic block diagram of an A/D converting means.

FIG. 1 shows an example of the PCM recording processor based on this invention. The music signal comes through an input port 32 and enters a A/D converting means 100 wherein a low pass filter 1 as illustrated in FIG. 4 eliminates useless high frequency signal components which cause noise. The instantaneous value of the signal is sampled by a sample-hold circuit 2, and enters an analog to digital converter (A/D converter) 3.

This example illustrates the PCM recording processor for single channel use. It is possible to construct a PCM processor for multi-channel use by means of time dividing multiplication by adding more input ports, low pass filters, and sample-hold circuits and switches for switching each path constructed with these components before the A/D converter 3. Apparently, the switching point may be either after the A/D converter or any other place. It is also possible to construct the whole system plurally for multi-channel use.

Figure 5:
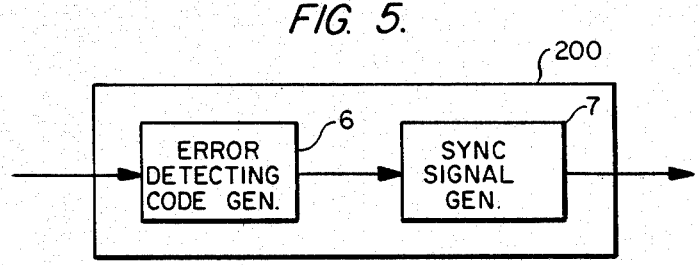
FIG. 5 is a schematic block diagram of a recording means.

The signal which the A/D converter has converted to a binary code representing the instantaneous value of the analog signal is added with an error correction code in an error correcting code generator 4 and enters a memory 5. The signal is interleaved in the memory 5 by rearranging the order of the signal. The output of A/D converting means enters a recording means wherein the signal is added with the error detecting code at an error detecting code generator 6 as illustrated in FIG. 5.

The error correcting code, interleaving, and error detecting code are used to correct errors when the recorded signal is reproduced incorrectly due to defects in the recording medium. The synchronizing signal which is synchronized to the driving timing for the recording medium is further added to the signal in a synchronizing signal generator 7 and the resultant signal is recorded on a recording medium 18 by a recording head 17.

Figure 8:
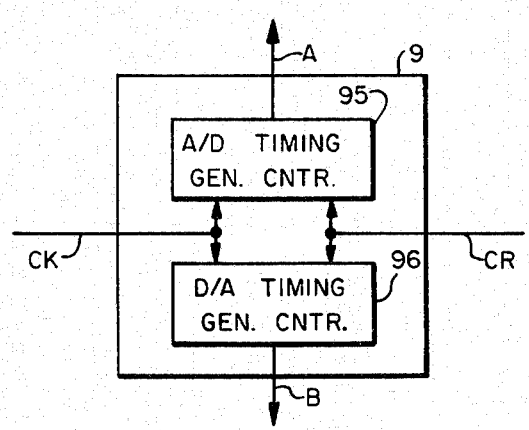
FIG. 8 is a schematic block diagram of a first timing generating means.

The timing signal for the recording system mentioned above is generated by a A/D timing generating means 300 coupled to a first timing generator 9 which is driven by a first clock signal generated by a clock signal generator 8 and a second timing generator 13 which is driven by a second clock signal generated by a clock signal generator 8. First timing generator 9 is shown in FIG. 8, wherein element 95 is an A/D timing generator counter and element 96 is a D/A timing generator counter. The A/D timing generating means 300 generates the timing signal used by the A/D converting means 100. The second timing generator 13 generates the timing signal used by recording means 200.

Figure 6:
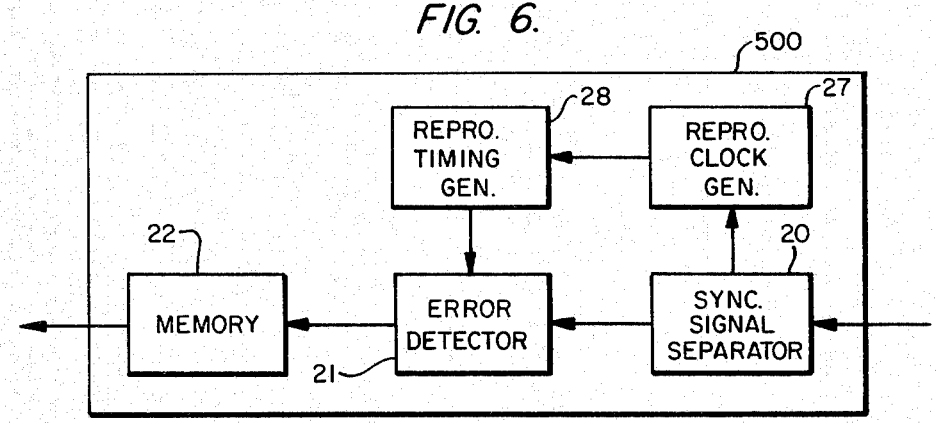
FIG. 6 is a schematic block diagram of a reproducing means.
Figure 7:
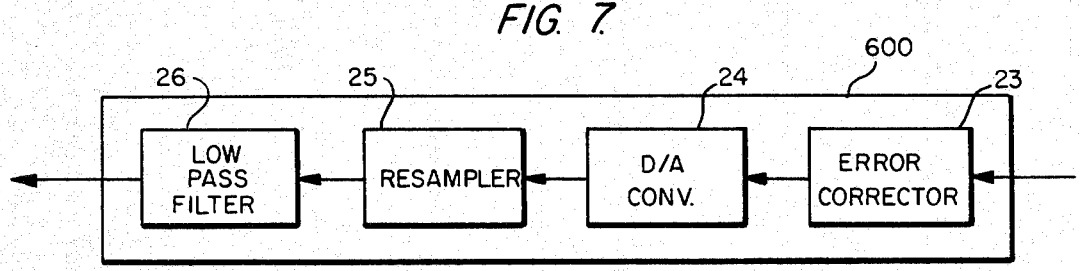
FIG. 7 is a schematic block diagram of a D/A converting means.

The reproduction system operates as follows. The signal recorded on a recording medium 18 is read out by a reproducing head 19 and enters to reproducing means 500. The synchronizing signal, which is separated by a synchronizing signal separator 20, is fed to a reproducing clock generator 27 as illustrated in FIG. 6. The remainder of the separated signal is fed to an error detector 21. When errors are detected, error flag bits are added to the signal and the result fed to a memory 22. In the memory 22, the signal is deinterleaved in order to rearrange the signal into the original order. The output of the reproducing means 500 enters a D/A converting means 600 wherein an error corrector 23 corrects the errors according to the error flag bits and a digital to analogue converter (D/A converter) 24 converts the signal to the instantaneous value of the original analog signal as illustrated in FIG. 7. A resampler 25 resamples the signal, avoiding the distorted point caused by the D/A converter. Consequently, only the original correct sampling value is fed to a low pass filter 26 in order to eliminate the high frequency component. The low pass filter 26 which has the same characteristics as the low pass filter 1 mentioned above interpolates the resampled signal and reproduce the original continuous signal.

This example represents the reproducing system for a single channel, but it is possible to construct the reproducing system for a multi-channel system by pluralizing the circuits after the resampler or the whole system. It is also possible to have the reproducing timing generator driving the recording medium, but it is the same as the recording timing generator 13. Therefore, this example uses it commonly. However, since the reproduced signal read out by the reproducing head 19 has a jitter caused by the stretch or slack of the recording medium 18, besides the above-noted timing generator 13 used for driving the recording medium, a timing generator 28, which generates the timing signal synchronized to the jittering reproduced signal, is necessary in order to drive the error detector 21 synchronously with respect to the reproduced signal. This example has a reproducing clock generator 27 which generates the clock signal synchronized to the reproduced synchronizing signal and a reproducing timing generator 28 which generates the timing signals synchronized to the jittering reproduced signal. Furthermore, it has a timing generating means 400 for the D/A converting means. The D/A converting timing must not include the jitter because if it includes jitter, the D/A converted signal becomes like an FM-modulated signal and results in distortion. In this example, the jitterless clock signal fed to the first timing generating means 9 and the output of the first timing generating means is applied to the D/A timing generating means 400 which control the D/A converting means 600 of the reproducing system, and consequently, it is possible to realize a jitterless reproduction. The memory 22 absorbs the jitter.

One method to synchronously operate the plural PCM recording processors mentioned above is to use one timing generator commonly, that is: a method arranged so as to feed the timing signal from one PCM recording processor which has the timing signal generator to other subordinate PCM recording processors which have no timing signal generators. But, in this case, since the number of timing signals which need to be sent are numerous, the lines sending these timing signals become expensive and the transmission of timing signals becomes impossible when the transmission lines are very long. Moreover, the subordinate PCM recording processors which have no timing generators cannot work by themselves when used alone.

This invention enables the PCM recording processors both to work independently when they are used alone and to work synchronized with other processors when they are used simultaneously by means of the timing generator which is included in each PCM recording processor and is able both to output the synchronizing signals to other processors and to receive such synchronizing signals from other processors.

As mentioned above, the timing generators of the PCM recording processor are roughly divided into the recording system and the reproducing system. In the recording system, these timing generators are further divided into the first timing generating means 9 which drives the A/D timing generating means for generating the timing signals for A/D conversion and the second timing generator 13 which generates the timing signals for driving the recording medium. In the same way in the reproducing system, these timing generators are divided into the third timing generator which generates the timing signals for driving the recording medium (these timing signals are the same as those for recording, therefore, this example uses the second timing generator 13 commonly for generating the third timing signals) and the D/A timing generating means which generates the timing signals for the D/A conversion. The D/A timing generating means is driven by the first timing generating means as well as the A/D timing generating means. In order to drive these two timing generators so as to be synchronized with each of the other PCM recording processors, a common clock signal and each other synchronizing signal are necessary. When the clock signal is not used commonly, the synchronizing signals which synchronize the clock signals of all the processors become necessary. Otherwise, the clock signals will not synchronize with each other. Moreover, since the clock signals between the first timing generator and the second timing generator are generally different, each synchronizing signal is necessary for each clock signal when these clocks are derived by dividing only one common clock signal. Consequently, two kinds of clock signals are used for the first and second timing generators in order to reduce the total number of the synchronizing signals. The reproducing system is also driven by these two kinds of clock signals.

Figure 2:
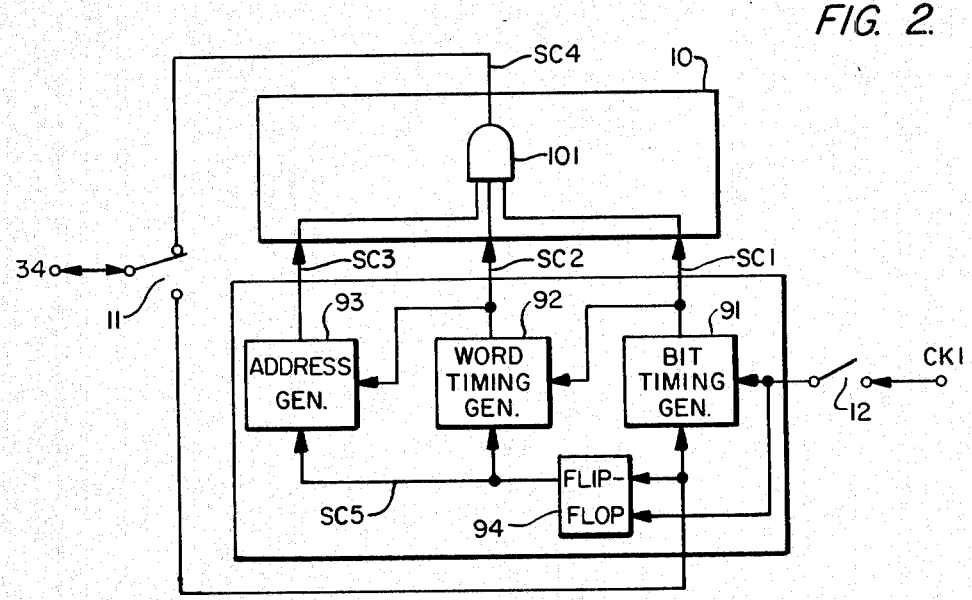
FIG. 2 is a synchronizing circuit according to this invention.

The first timing generating means 9 consists of a bit timing generator 91 which generates the timing signals for carrying the A/D converted signal bit by bit, a word timing generator 92 which generates the sampling timing signal by dividing the bit timing signal and an address generator 93 which generates the writing address of the memory 5 as illustrated in FIG. 2. Each timing generator consists of a synchronous counter and gates but the connections between these counters are asynchronous because the dividing ratio is very large. Consequently, in order to drive these counters so as to be synchronized with the outer counters, each synchronizing signal is necessary for each counter. In order to drive the whole PCM recording processor synchronously with the other processors, it is necessary to send the synchronizing signals to all counters working asynchronously with respect to each other in the other processors and it makes the number of the lines for synchronization extremely large.

Figure 3:
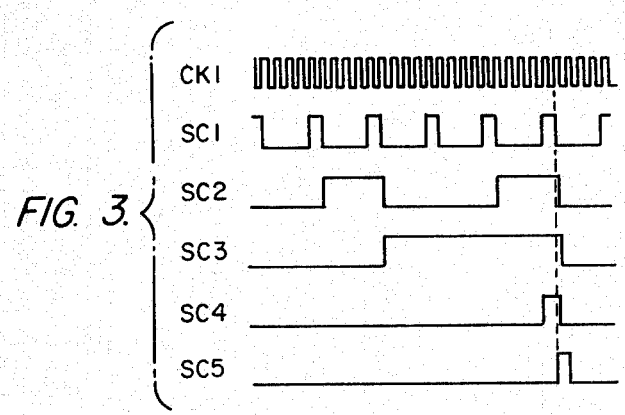
FIG. 3 is timing diagram of a synchronizing signal.

In this invention, we use the common synchronizing signal which is obtained by feeding each synchronizing signal of each counter, which works along with the clock signals divided from one master clock signal in turn, together to the logical AND circuit 101. FIG. 3 illustrates the arrangement thereof. Each synchronizing signal SC1, SC2, SC3 is obtained by dividing the master clock signal CK1. The counter 91 rotates cyclically. Its period is SC1, which is also the clock signal for the counter 92. In the same way, the counter 92 rotates in the period of SC2 and the SC2 is the clock signal of the counter 93. The logical AND signal of these synchronizing signals is the SC4 in FIG. 3.

When applying this signal SC4 to the counters of the timing generator in the PCM recording processor which is working in the slave mode, the counter 91 is reset synchronously with the synchronizing signal SC4 because the counter 91 is a synchronous counter which is reset at the rising edge of the clock signal CK1 while the synchronizing signal SC4 is high. On the other hand, the counter 93 may not be reset by the signal SC4 if the counter 93 is also an synchronous counter which is resetted at the falling edge of the clock signal SC2 while the synchronizing signal SC4 is high. Since the signal SC4 is obtained by AND-gating the signal SC1 which is the clock signal of the counter 92 and the output signal SC2 of the counter 92 which falls down after the falling edge of SC1, there is a probability that the falling edge of the signal SC2 comes after the high level term of the signal SC4. If so, the counter 93 will not be reset by the signal SC4.

In order to avoid this undesirable phenomenon in this invention, we adopt a synchronously resettable counter only for the first stage of the asynchronously cascaded counters which use one synchronizing signal commonly and use asynchronously resettable counters for the following stages. In this construction, the resetting signal SC4 applied to these asynchronously resettable counters should be delayed by one master clock period, otherwise, the counters may count up by the falling edge of their clock signal just after the resetting pulse SC4. The flip-flop 94 delays the resetting pulse SC4 by one master clock period. But when we use the delayed signal SC5 for a resetting pulse, the counter is reset after its count is equal to zero; this means that nothing undesirable has occured. On the contrary, by this method, it is possible to reduce the number of the synchronizing signals and the effect is very profitable.

What is mentioned above is the explanation of the construction of the first timing generating means and A/D timing generating means, but the second timing generators also may have the same construction. That is, they are constructed with several synchronous counters cascaded asynchronously and the synchronizing signals are generated by AND-gating each synchronizing signal outputted by each counter in each timing generator. The counters in the first stages are synchronously resettable and the other counters in the following stages are asynchronously resettable counters which are reset by the delayed synchronizing signals.

There are roughly two kinds of timing signals which drive the PCM recording processor. One group is of the clock or timing signals which are used for A/D-D/A conversion. The timing signals for A/D conversion and the those for D/A conversion are basically the same, and consequently, it is possible to use one timing generator commonly but in this example, we used two timing generating means, one for the A/D conversion and another for D/A conversion. But these two means are driven by one common timing generator. Therefore, one synchronizing signal is used and the clock signal is also one. Another group is of the clock or timing signals which drive the recording medium. These timing signals are also able to be used commonly for recording and reproducing. In this example, we used one timing generator for both recording and reproducing, and therefore, we need only one clock signal and one synchronizing signal.

The switches 11, 12, 15, 16 switch these two kinds of synchronizing signals and two kinds of clock signals to the output ports or from the input ports according to the master/slave mode of the processor. When the processor is in master mode, the switch 11 connects the outputs of the first synchronizing signal generator 10 to the first synchronizing signal port 34. In the same way, the switch 12 connects the outputs of the clock generator 8 to the first clock signal port 35 as well as to the first timing generator 9. The switch 15 connects the output of the second synchronizing signal generator 14 to the second synchronizing signal port 37. The switch 16 connects the outputs of the clock generator 8 to the second clock signal port 36 as well as to the second timing generator 13.

On the other hand, the PCM recording processor in the slave mode receives the above mentioned synchronizing signals and clock signals through the corresponding synchronizing signal ports and clock signal ports. In this case, the switch 11 connects the external synchronizing signal coming through the first synchronizing signal port 34 to the first timing generator 9 as a reset signal. The switch 12 cuts off the internal clock signal generator 8 and connects the external clock signal coming through the first clock signal port 35 to the first timing generating means 9. In the same way, the switch 15 connects the external synchronizing signal coming through the second synchronizing signal port 37 to the second timing generator 13 as well as the switch 16 cuts off the clock signal generator 8 and connects the external clock signal coming through the second clock signal port 36 to the second timing generator 13.

Under the above-noted conditions, the slave PCM recording processor records or reproduces the PCM signal completely synchronized with the master PCM recording processor. The number of processors in a slave mode is easily increasable. The synchronizing signal ports and clock signal ports are used bidirectionally. Consequently, it is possible to send and receive the synchronizing signals and clock signals through a few signal ports. That contributes to the lower cost and higher reliability of the processor.

The synchronizing method according to this invention is applicable both to the PCM recording processor of the rotary head type and to that of stationary head type. When applying this invention to the PCM recording processor of the rotary head type, it becomes easily possible to record or reproduce the PCM signals in a multi-channel system that was regarded impossible before. When applying this invention to the PCM recording processor of the stationary head type, it becomes easily possible to double the number of channels.

What we claim is:

1. A PCM recording processor comprising: an A/D converting means for converting an analog input signal to a digital signal; a recording means coupled to said A/D converting means for recording said digital signal on a recording medium; a reproducing means for reading out said digital signal from said recording medium; a D/A converting means coupled to said reproducing means for converting said digital signal to an analog signal; an A/D timing generating means comprising gates for controlling said A/D converting means; a D/A timing generating means comprising gates for controlling said D/A converting means; a first timing generating means comprising counters for providing timing signals to both said A/D timing generating means and said D/A timing generating means; a first synchronizing signal generator coupled to said first timing generating means for generating a first synchronizing signal; a first synchronizing signal port; a first switching means for (a) connecting an output of said first synchronizing signal generator to said first synchronizing signal port when said PCM recording processor is in a master mode and for (b) connecting first synchronizing signal port to a reset terminal of said first timing generating means in order to reset said first timing generating means when said PCM recording processor is in a slave mode; a second timing generating means for controlling said recording means and for driving said recording medium; a second synchronizing signal generator coupled to said second timing generating means for generating a second synchronizing signal;

a second synchronizing signal port; a second switching means for (a) connecting an output of said second synchronizing signal generator to said second synchronizing signal port when said PCM recording processor is in the master mode and for (b) connecting said second synchronizing signal port to a reset terminal of said second timing generator in order to reset said second timing generator when said PCM recording processor is in the slave mode; a clock generator for generating a first clock signal for said first timing generating means and a second clock signal for said second timing generator; a first clock signal port; a third switching means for (a) connecting said first clock signal to both said first clock signal port and said first timing generating means when said PCM recording processor is in the master mode and for (b) connecting said first clock signal port to said first timing generating means when said PCM recording processor is in the slave mode; a second clock signal port; and a fourth switching means for (a) connecting said second clock signal to both said second clock signal port and said second timing generator when said PCM recording processor is in the master mode and for (b) connecting said second clock signal port to said second timing generator when said PCM recording processor is in the slave mode.

2. A PCM recording processor according to claim 1, wherein said first timing generator means comprises: A/D timing generating counters coupled to said A/D timing generating means; and D/A timing generating counters coupled to said D/A timing generating means, wherein both of said counters are supplied with said first clock signal and said first synchronizing signal.

* * * * *